US010780861B2

(12) United States Patent
Herman et al.

(10) Patent No.: US 10,780,861 B2
(45) Date of Patent: Sep. 22, 2020

(54) LIQUID DROPLET PATH PREDICTION

(71) Applicant: Ford Global Technologies, LLC, Dearborn, MI (US)

(72) Inventors: David Michael Herman, Oak Park, MI (US); Ashwin Arunmozhi, Canton, MI (US); Venkatesh Krishnan, Canton, MI (US); Sunil Patil, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 159 days.

(21) Appl. No.: 16/242,225

(22) Filed: Jan. 8, 2019

(65) Prior Publication Data

US 2020/0216033 A1 Jul. 9, 2020

(51) Int. Cl.
*G06K 9/00* (2006.01)
*B60S 1/08* (2006.01)
*G06T 7/20* (2017.01)
*G05D 1/00* (2006.01)
*G06T 7/70* (2017.01)

(52) U.S. Cl.
CPC .......... *B60S 1/0844* (2013.01); *G05D 1/0088* (2013.01); *G06K 9/00805* (2013.01); *G06T 7/20* (2013.01); *G06T 7/70* (2017.01)

(58) Field of Classification Search
CPC .............................................. B60W 60/00182
See application file for complete search history.

(56) References Cited

U.S. PATENT DOCUMENTS

| | | | |
|---|---|---|---|
| 5,708,859 A | 1/1998 | Tajima et al. | |
| 6,353,392 B1* | 3/2002 | Schofield | B60H 1/00785 318/444 |
| 6,768,422 B2* | 7/2004 | Schofield | B60H 1/00785 250/208.1 |
| 8,362,453 B2* | 1/2013 | Taoka | G06K 9/00791 250/573 |
| 8,797,417 B2* | 8/2014 | Gayko | G06T 5/50 348/222.1 |
| 8,914,197 B2* | 12/2014 | Chen | G06K 9/209 701/49 |
| 9,217,864 B2 | 12/2015 | Bell et al. | |
| 9,505,382 B2 | 11/2016 | Gokan | |
| 9,707,896 B2 | 7/2017 | Boegel et al. | |
| 10,035,498 B2* | 7/2018 | Richardson | B60R 1/00 |
| 10,095,934 B2* | 10/2018 | Takemura | H04N 5/225 |
| 10,430,833 B2* | 10/2019 | Newman | B60W 30/085 |
| 2002/0190231 A1* | 12/2002 | Kobayashi | G01N 21/43 250/573 |
| 2006/0193058 A1* | 8/2006 | Ootsuka | G03B 5/00 359/665 |

(Continued)

OTHER PUBLICATIONS

Yang et al., "Blurry when wet: animating raindrop behavior." IEEE Potentials 24, No. 3 (2005): 33-36. (Year: 2005).*

(Continued)

*Primary Examiner* — Feng Niu
(74) *Attorney, Agent, or Firm* — Frank A. MacKenzie; Bejin Bieneman PLC (57) ABSTRACT

A system includes a processor and a memory storing instructions executable by the processor to predict a path of a liquid droplet on a surface, and then, actuate one or more vehicle components based on the path.

20 Claims, 5 Drawing Sheets

(56) References Cited

U.S. PATENT DOCUMENTS

| | | | |
|---|---|---|---|
| 2014/0029008 A1* | 1/2014 | Hirai | G01N 21/552 |
| | | | 356/445 |
| 2014/0232869 A1 | 8/2014 | May et al. | |
| 2015/0302574 A1* | 10/2015 | Muramatsu | B62D 15/0275 |
| | | | 348/148 |
| 2016/0162740 A1 | 6/2016 | Takemura et al. | |
| 2016/0311405 A1 | 10/2016 | Richardson et al. | |
| 2018/0009418 A1* | 1/2018 | Newman | B60S 1/0818 |
| 2019/0106085 A1* | 4/2019 | Bacchus | B60S 1/56 |
| 2019/0329768 A1* | 10/2019 | Shalev-Shwartz | |
| | | | G08G 1/0968 |

OTHER PUBLICATIONS

Wang et al., "Real-time modeling and rendering of raining scenes." The Visual Computer 24, No. 7-9 (2008): 605-616. (Year: 2008).*

Zarrabeitia et al., "Stereo reconstruction of droplet flight trajectories." IEEE transactions on pattern analysis and machine intelligence 37, No. 4 (2014): 847-861. (Year: 2014).*

Clausen et al., "Simulating Liquids and Solid-Liquid Interactions with Lagrangian Meshes", ACM Transactions on Graphics, vol. 32, No. 2, Article 17, Apr. 2013, http://dx.doi.org/0.1145/2451236.2451243.

Guo et al., "Convolutional Neural Networks for Steady Flow Approximation", KDD '16, Aug. 13-17, 2016, San Francisco, CA, http://dx.doi.org/10.1145/2939672.2939738.

He et al., "Robust Simulation of Sparsely Sampled Thin Features in SPH-Based Free Surface Flows", ACM Transactions on Graphics, vol. 34, No. 1, Article 7, Nov. 2014, http://dx.doi.org/10.1145/2682630.

Hennigh, "Lat-Net: Compressing Lattice Boltzmann Flow Simulations using Deep Neutral Networks" arXiv:1705.09036v1, May 25, 2017.

Rousseau et al., "Realistic real-time rain rendering", Computers & Graphics, Sep. 30, 2005.

Tompson et al., "Accelerating Eulerian Fluid Simulation With Convolutional Networks" Proceedings of the 34th International Conference on Machine Learning, PMLR 70, 2017, Sydney, Australia, arXiv:1607.03597v6, Jun. 22, 2017.

Yang et al., "Real-Time Simulation: Water Droplets on Glass Windows", Copublished by the IEEE3 CS and the AIP, Jul./Aug. 2004.

* cited by examiner

LIQUID DROPLET PATH PREDICTION

BACKGROUND

A vehicle may use image data from an optical sensor for operation. Liquid droplets on a surface in a field of view of the optical sensor may reduce a usefulness of the image data for operating the vehicle.

DETAILED DESCRIPTION

Introduction

A system includes a processor and a memory storing instructions executable by the processor to predict a path of a liquid droplet on a surface, and then, actuate one or more vehicle components based on the path.

The instructions may further include instructions to determine that the path is from a low priority area on the surface to a high priority area on the surface, where the high priority area has a higher probability of containing detectable objects that may interfere with operation of a vehicle as compared to the low priority area.

The instructions may further include instructions to predict the path based on at least one of a vehicle velocity, a wind velocity, an incline angle of the surface, a vehicle acceleration, a size of the liquid droplet, and a hydrophobicity of the surface.

The instructions may further include instructions to predict the path based on stored data indicating one or more previous positions of the liquid droplet.

The instructions may further include instructions to actuate the one or more vehicle components by actuating a cleaning system.

The instructions may further include instructions to predict a second path of the liquid droplet after actuating the cleaning system.

The instructions may further include instructions to actuate the one or more vehicle components by actuating at least one of a steering system, a braking system, and a propulsion system.

The instructions may further include instructions to wait an amount of time after predicting the path, and then update one or more parameters of the prediction based on a comparison of a position of the liquid droplet with the path.

The system may include an optical sensor defining a field of view and in communication with the processor, wherein the surface is in the field of view.

The instructions may further include instructions to identify an amount of time for the liquid droplet to reach a future position, and to determine the amount of time to reach the future position is greater than a threshold amount of time.

The surface may be on one of a lens and a windshield.

A method includes predicting a path of a liquid droplet on a surface, and then, actuating one or more vehicle components based on the path.

The path may be predicted based on at least one of a vehicle velocity, a wind velocity, an incline angle of the surface, a vehicle acceleration, a size of the liquid droplet, and a hydrophobicity of the surface.

The method may include waiting an amount of time after predicting the path, and then updating one or more parameters of the prediction based on a comparison of a position of the liquid droplet with the path.

The method may include identifying an amount of time for the liquid droplet to reach a future position, and to determine the amount of time to reach the future position is greater than a threshold amount of time.

Actuating one or more vehicle components may include actuating a cleaning system, and the method may further include predicting a second path of the liquid droplet after actuating the cleaning system.

The path may be predicted based on stored data indicating one or more previous positions of the liquid droplet.

A system includes means for detecting a liquid droplet on a surface. The system includes means for predicting a path of the liquid droplet on the surface. The system includes means for moving the liquid droplet relative to the surface based on the path.

The system may include means for navigating a vehicle based on the path.

The system may include means for determining that the path is from a low priority area on the surface to a high priority area on the surface, wherein the high priority area has a higher probability of containing detectable objects that may interfere with operation of a vehicle as compared to the low priority area.

Figure 1:
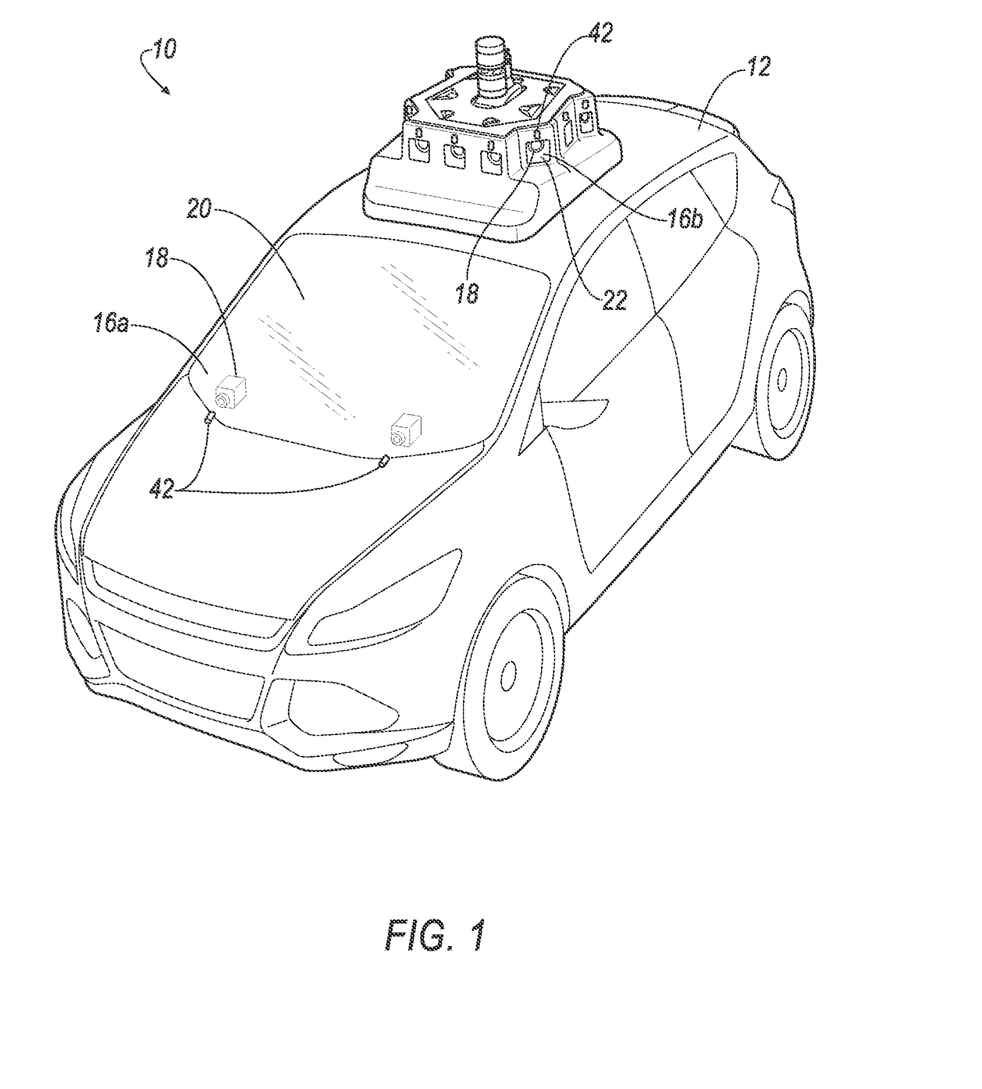
FIG. 1 is a perspective view of a vehicle having a system for predicting a path of a liquid droplet.
Figure 2:
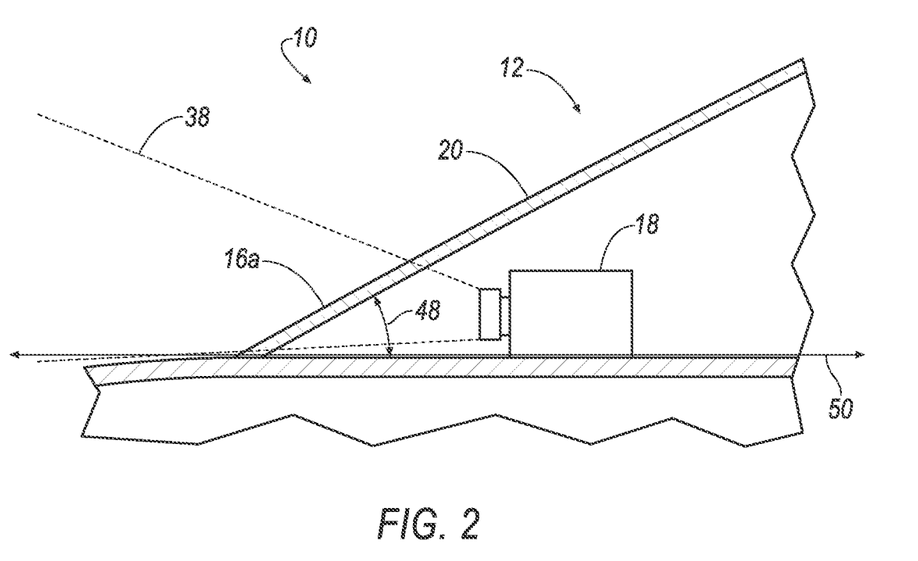
FIG. 2 is a section view of a portion of the vehicle including a windshield and an optical sensor.
Figure 3:
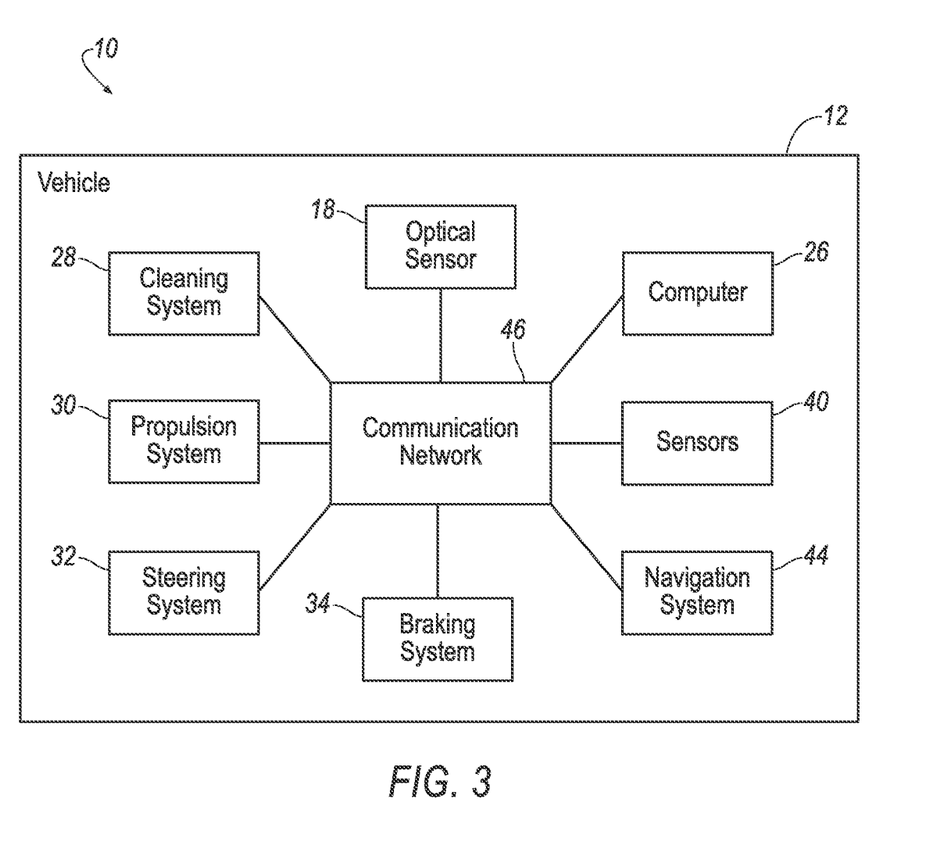
FIG. 3 is a block diagram of components of the system and the vehicle.

With reference to the Figures, wherein like numerals indicate like parts throughout the several views, a system 10 for a vehicle 12 includes means for detecting a liquid droplet 14 on a surface 16a, 16b. An example means for detecting the liquid droplet 14 includes an optical sensor 18 directed at a surface 16a on a windshield 20 or a surface 16b on a lens 22. The system 10 includes means for predicting a path 24 of the liquid droplet 14 on the surface 16a, 16b. An example means for predicting the path includes a computer 26 having a processor and a memory storing instructions executable by the processor to predict the path 24 of the liquid droplet 14 on the surface 16a, 16b, and then, actuate one or more vehicle components based on the path 24. The system 10 includes means for moving the liquid droplet 14 relative to the surface 16a, 16b based on the path 24. An example means for moving the liquid droplet 14 include a cleaning system 28 in communication with the computer 26.

As used herein, vehicle components are systems, assemblies, sub-assemblies, and/or other structures of the vehicle 12 actuatable by the computer 26 to perform a physical function, e.g., actuate the cleaning system 28, a propulsion system 30, a steering system 32, and/or a braking system 34.

Predicting the path 24 of the liquid droplet 14 aids in autonomous or semi-autonomous operation of the vehicle 12 by predicting when a detected object 36 may be obscured by the liquid droplet 14, and by reducing interference of the liquid droplet 14 with a view of an area that has a relatively higher probability of including detectable objects 36. For example, the computer 26 may operate the vehicle 12 such that the path 24 is repositioned relative to the higher probability area. Predicting the path 24 of the liquid droplet 14 permits efficient use of vehicle resources when clearing the surface 16a, 16b. For example, the computer 26 may refraining from actuating the cleaning system 28 when the path 24 indicates that liquid droplet 14 will not interfere with data collected by the optical sensor 18 in the higher probability areas.

Apparatus

The vehicle 12 may be any type of passenger or commercial automobile such as a car, a truck, a sport utility vehicle, a crossover vehicle, a van, a minivan, a taxi, a bus, etc.

The windshield 20 protects an interior of the vehicle 12, e.g., from wind, precipitation, debris, etc. The windshield 20 is transparent, e.g., such that occupants of the vehicle 12 may see therethrough. The windshield 20 may be supported by the vehicle 12 at a forward end of a passenger cabin, a rearward end of the passenger cabin, etc. The surface 16a may be away from the passenger cabin, e.g., relative to the windshield 20. In other words, the surface 16a is typically outside the passenger cabin.

The optical sensor 18 detects light. The optical sensor 18 may be a scanning laser range finder, a light detection and ranging (LIDAR) device, an image processing sensor such as a camera, or any other sensor that detects light. One more or more optical sensors 18 may be supported by the vehicle 12, e.g. stereo camera pair. For example, one of the optical sensors 18 may detect light through the windshield 20 and another of the optical sensors 18 may detect light through the lens 22. In another example, the optical sensor 18 may be capable of measuring both the reflectivity of objects and their distances, e.g. a time of flight camera. The optical sensor 18 may be capable of detecting on or more wavelengths, such as red, blue, green, visible light, near infrared, etc. The optical sensors 18 may be placed in proximity and share the same exterior facing optical surface, e.g. windshield, allowing one camera image to predict a future occlusion in another camera of the same water droplet passing along the respective field of view of each optical sensor 18.

The optical sensor 18 has a field of view 38. The field of view 38 is a volume relative to the optical sensor 18 from which light is detectable by the optical sensor 18. In other words, light generated by, and/or reflected off, an object within the field of view 38, and towards the optical sensor 18, is detectable by the optical sensor 18, provided such light is not blocked before reaching the optical sensor 18. The surface 16a, 16b is in the field of view 38, e.g., depending on a location of the optical sensor 18.

Figure 5:
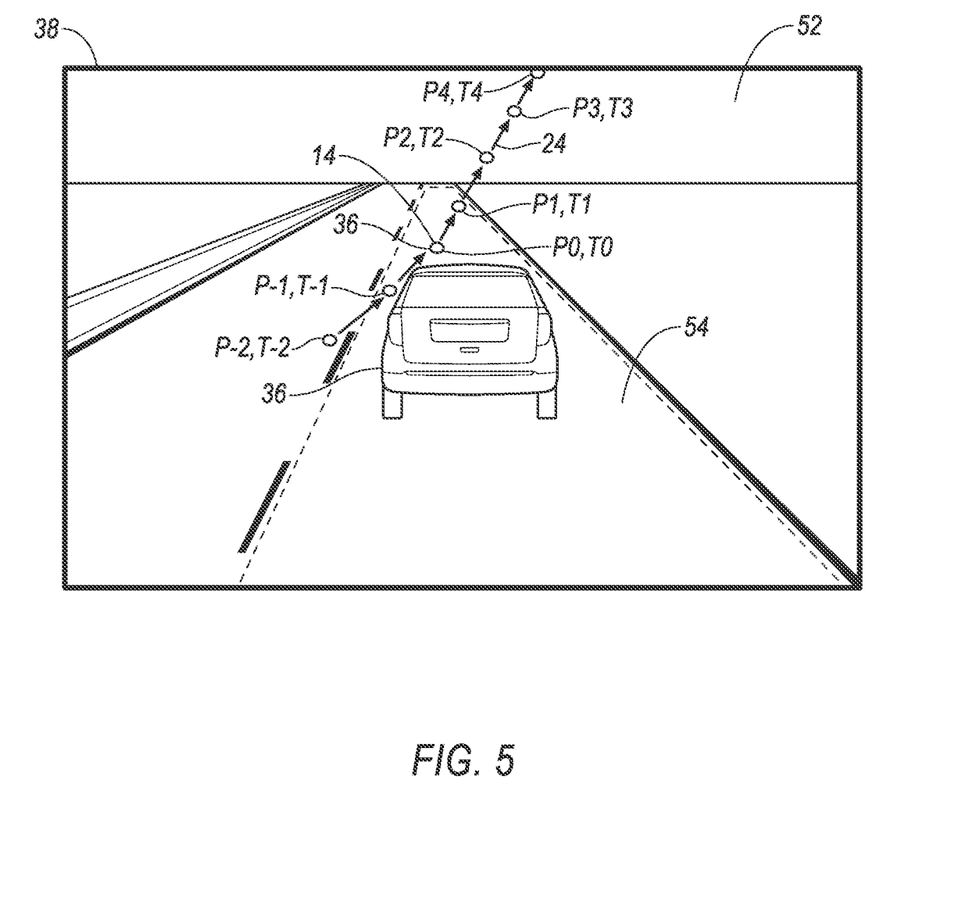
FIG. 5 is an illustration of an example image captured by the optical sensor.

The optical sensor 18 generates image data based on light detected from within the field of view 38. The image data indicates a detected image with a two-dimensional array of pixels, e.g., a grid having rows and columns of pixels. Each pixel may indicate a color, a brightness, a hue, etc., of light detected from a specific portion of the field of view 38. An illustration of an example image that may be indicated by image data from the optical sensor 18 is shown in FIG. 5.

The vehicle 12 may include other sensors 40. The sensors 40 may detect internal states of the vehicle 12, for example, wheel speed, wheel orientation, and engine and transmission variables. The sensors 40 may detect the position or orientation of the vehicle, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 40 may detect the external world, for example, radar sensors, scanning laser range finders, light detection and ranging (LIDAR) devices, and image processing sensors such as cameras. The vehicle 12 may further include communications devices, for example, vehicle-to-infrastructure (V2I) or vehicle-to-vehicle (V2V) devices.

The lens 22 protects the optical sensor 18. The lens 22 may focus light on the optical sensor 18. The lens 22 may be partially or fully transparent. The lens 22 may be plastic, glass, etc. The surface 16b may be away from the sensor, e.g., relative to a remainder of the lens 22. The lens 22 may be rotationally symmetric or non-rotationally symmetric (a free form lens).

The cleaning system 28 removes objects, such as liquid droplets 14, from the surface 16a of the windshield 20, the surface 16b of the lens 22, etc., e.g., in response to an instruction from the computer 26. The cleaning system 28 may include a nozzle 42 directed at the surface 16a, 16b. The nozzle 42 may be provided with a flow of fluid, e.g., air from a blower, compressed air from a tank, etc., e.g., when the cleaning system 28 is actuated to an on state. The air may urge the liquid droplet 14, e.g., away from the nozzle 42. An additional nozzle 42 may spray cleaning fluids to assist in the removal of other obstructions. Other techniques may be utilized such as ultrasonic vibration. Air from the nozzle 42 may be provided at a specified pressure, rate, duration, etc. The cleaning system 28 may be in communication with the computer 26.

The steering system 32 controls a steering angle of wheels of the vehicle 12, e.g., in response to an instruction from the computer 26, in response to an operator input, such as to a steering wheel, or combination of the two such in the case of driver assistive technologies. The steering system 32 may be a rack-and-pinion system with electric power-assisted steering, a steer-by-wire system, or any other suitable system for controlling the steering angle of the wheels. The steering system 32 may be in communication with the computer 26.

The braking system 34 resists motion of the vehicle 12 to thereby slow and/or stop the vehicle 12, e.g., in response to an instruction from the computer 26 and/or in response to an operator input, such as to a brake pedal. The braking system 34 may include friction brakes such as disc brakes, drum brakes, band brakes, and so on; regenerative brakes; any other suitable type of brakes; or a combination. The braking system 34 may be in communication with the computer 26.

The propulsion system 30 translates energy into motion of the vehicle 12, e.g., in response to an instruction from the computer 26 and/or in response to an operator input, such as to an accelerator pedal. For example, the propulsion system 30 may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the vehicle 12. The propulsion system 30 may be in communication with the computer 26.

The vehicle 12 may include a navigation system 44 that can determine a location of the vehicle 12. The navigation system 44 is implemented via circuits, chips, or other electronic components. The navigation system 44 may be implemented via satellite-based system such as the Global Positioning System (GPS). The navigation system 44 may triangulate the location of the vehicle 12 based on signals received from various satellites in the Earth's orbit. The navigation system 44 is programmed to output signals representing the location of the vehicle 12 to, e.g., to the computer 26 via a communication network 46. In some instances, the navigation system 44 is programmed to determine a route from the present location to a future location. The navigation system 44 may access a virtual map stored in memory of the navigation system 44 and/or computer 26, and develop the route according to the virtual map data. The virtual map data may include lane information, including a number of lanes of a road, widths and edges of such lanes, etc.

The communication network 46 includes hardware, such as a communication bus, for facilitating communication among vehicle components, such as the computer 26, the propulsion system 30, the steering system 32, the navigation system 44, the braking system 34, the cleaning system 28, the optical sensor 18, and other sensors 40. The communication network 46 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 26, implemented via circuits, chips, or other electronic components, is included in the system 10 for carrying out various operations, including as described herein. The computer 26 is a computing device that generally includes a processor and a memory, the memory including one or more forms of computer-readable media, and storing instructions executable by the processor for performing various operations, including as disclosed herein. The memory of the computer 26 further generally stores remote data received via various communications mechanisms; e.g., the computer 26 is generally configured for communications on the communication network 46 or the like, and/or for using other wired or wireless protocols, e.g., Bluetooth, etc. The computer 26 may also have a connection to an onboard diagnostics connector (OBD-II). Via the communication network 46 and/or other wired or wireless mechanisms, the computer 26 may transmit messages to various devices in the vehicle 12 and/or receive messages from the various devices, e.g., the steering system 32, the braking system 34, the propulsion system 30, the optical sensor 18, the cleaning system 28, the navigation system 44, the sensors 40, etc. Although one computer 26 is shown in FIG. 3 for ease of illustration, it is to be understood that the computer 26 could include, and various operations described herein could be carried out by, one or more computing devices, including computing devices remote from and in communication with the vehicle 12.

The computer 26 may be programmed to, i.e., the memory may store instructions executable by the processor to, operate the vehicle 12 in an autonomous mode, a semi-autonomous mode, or a non-autonomous mode. For purposes of this disclosure, the autonomous mode is defined as one in which each of propulsion system 30, the braking system 34, and the steering system 32 are controlled by the computer 26; in a semi-autonomous mode the computer 26 controls one or two of the propulsion system 30, the braking system 34, and the steering system 32; in a non-autonomous mode, a human operator controls the propulsion system 30, the braking system 34, and the steering system 32.

Operating the vehicle 12, e.g., in the autonomous mode and/or semi-autonomous mode, may include increasing or decreasing vehicle speed, changing course heading, etc. The computer 12 may operate the vehicle 12 by transmitting instructions to the steering system 32, the braking system 34, and the propulsion system 30 based on information from the navigation system 44, the optical sensor 18, and other sensors 40. For example, the computer 26 may transmit instructions to the steering system 32, the braking system 34, and/or the propulsion system 30 indicating a change in wheel angle, an increase or decrease in resistance to movement of the vehicle 12, and/or an increase or decrease in power output, respectively. The computer 26 may operate the vehicle 12 to navigate one more roads to a destination, to maintain and/or change lanes of a road, to avoid obstacles, etc.

The computer 26 may be programmed to identify a liquid droplet 14 on the surface 16a, 16b, such as on the surface 16b on the lens 22, the surface 16a on the windshield 20, etc. The computer 26 may identify the liquid droplet 14 based on image data from the optical sensor 18. For example, the computer 26 may analyze image data to identify the liquid droplet 14 according to image recognition techniques, e.g., as are known.

As one such example, the computer 26 may identify groupings of pixels in image data having a certain shape, color, brightness, intensity gradient, size, etc. The shape may be compared to a specified and stored threshold shape, e.g., a circle having a roundness tolerance of a radius of +/−1 millimeter from a center the pixel grouping. The brightness may be compared to one or more specified and stored brightness thresholds, e.g., brighter than 1200 lux and darker than 120 lux. The size may be compared to one or more specified and stored threshold sizes, e.g., smaller than 12 millimeters and greater than 2 millimeters.

Thresholds may be predetermined and stored in a non-volatile memory of the computer 26. The brightness and/or size thresholds may be predetermined based on empirical testing, e.g., analysis of image data of one or more known liquid droplets on a surface. The computer 26 may select among one or more stored thresholds, e.g., based on a time of day, amount of ambient light, analysis of a remainder of pixels in the image data, etc. For example, in daylight liquid droplets 14 on the surface 16a, 16b may be less bright than a remainder of an image, and during night, i.e., in the absence of daylight, liquid droplet 14 on the surface 16a, 16b may be brighter, e.g., from reflecting headlights of another vehicle, a streetlight, etc. The computer 26 may use other techniques and processes to identify the liquid droplet 14.

The computer 26 may identify a position of the liquid droplet 14. As used herein, a position of the liquid droplet 14 is a location of the liquid droplet 14 on a surface 16a, 16b as specified by a group of pixels identified in image data as the liquid droplet 14. For example, a position of a liquid droplet 14 may be specified by a vertical and a horizontal location of the group of pixels identified in image data as the liquid droplet 14, e.g., x,y coordinates or the like indicating a column and a row of the image data where the group of pixels identified as a liquid droplet 14 are located. The x,y coordinates determined for a droplet 14 in an image can then be mapped to x,y coordinates or the like for a surface 16a, 16b using conventional techniques, e.g., an image could include a fiducial marker such as an edge, boundary, or other marker of the surface 16a, 16b which could then be used to map coordinates from an image to coordinates, i.e., a location, of the liquid droplet 14 on a surface 16a, 16b, The computer 26 may identify a time at which the liquid droplet 14 was at the identified position. The computer 26 may store, in the memory, one or more positions of the liquid droplet 14 and associated times, e.g., tracking movement of the liquid droplet 14 over time. In FIG. 5 a position P0 of the liquid droplet 14 is shown at a time T0 (i.e., FIG. 5 illustrates a droplet 14 position P0 at current time T0); further stored positions and associated times of the liquid droplet 14 are shown at P-1, T-1; P-2, T-2; etc., i.e., showing movement of the droplet 14 over time.

The computer 26 may be programmed to predict a path 24 of a liquid droplet 14 on the surface 16a, 16b. The path 24 of the liquid drop indicates one or more predicted future positions of the liquid droplet 14. The path 24 may indicate one or more future times at which the liquid droplet 14 is predicted to be at the one or more predicted future positions. The path 24 may include one or more discrete position and times, e.g., relative to the identified position of the liquid droplet 14, relative to the top and side edges of the image data, etc. In other words, the path 24 may be data indicating a series of positions and times. For example, the path 24 may include a formula or algorithm, e.g., indicating a predicted future position of the liquid droplet 14 as a function of time e.g., relative to the identified position of the liquid droplet 14, relative to the top and side edges of the image data, etc. The formula or algorithm may indicate a linear path, a curved path, and/or a combination thereof. The computer 26 may use various measured values and predetermined constants determine the formula or algorithm used to predict the path 24, e.g., using Newtonian mechanics, fluid dynamics, etc. Such formula or algorithm may utilize known finite element or volume methods for liquid path prediction, e.g., using the Lagrangian technique and/or Navier Stokes equation, and important model parameters such as the Reynolds number for the liquid droplet 14, the Weber number for the liquid droplet 14, etc. As another example, a deep neural network 200 of the computer 26 may be trained to predict the path 24 (further described below). In FIG. 5 the predicted future positions and associated times are shown at P1, T1; P2, T2; etc.

The computer 26 may be programmed to predict the path 24 based on a velocity of the vehicle 12. Velocity of the vehicle 12 is a speed, e.g., in miles per hour, of the vehicle 12 relative to a ground on which the vehicle 12 is supported. The velocity of the vehicle 12 may include a direction, e.g., a compass heading direction, a direction relative to the vehicle 12, etc. The computer 26 may identify the velocity of the vehicle 12 based on information from the sensors 40, the navigation system 44, etc., e.g., received via the communication network 46 and indicating a wheel speed, a compass heading direction of the vehicle 12, a change in position of the vehicle 12 over time, etc.

The velocity of the vehicle 12 affects the path 24 at least in part by affecting a relative velocity of ambient air to the vehicle 12. Such air strikes and/or travels along the surface 16a, 16b and urges the liquid droplet 14 to move along the surface 16a, 16b, e.g., parallel to a direction of movement, e.g., as specified by a velocity vector, of the ambient air. For example, the liquid droplet 14 may be urged toward the rear of the vehicle 12 when the velocity of the vehicle 12 in a vehicle forward direction.

The computer 26 may be programmed to predict the path 24 based on a wind velocity. Wind velocity is a speed, e.g., in miles per hour, of movement of ambient air relative to a ground on which the vehicle 12 is supported. The wind velocity may include a direction, e.g., a compass heading direction, a direction relative to the vehicle 12, etc. The computer 26 may determine the direction of the wind velocity of the vehicle 12, e.g., by combining the compass heading direction of the vehicle 12 with the compass heading direction of the wind velocity. The computer 26 may determine the wind velocity based on information from the sensors 40, information received from a remote computer indicating the wind velocity, etc. The wind velocity affects the path 24 at least in part by affecting the relative velocity of ambient air to the vehicle 12, e.g., as discussed above for the velocity of the vehicle 12.

The computer 26 may be programmed to predict the path 24 based on an incline angle 48 of the surface 16a, 16b. The incline angle 48 is an angle of the surface 16a, 16b relative to a horizon, i.e., relative to a level horizontal axis 50 (shown in FIG. 2). The incline angle 48 controls a normal force applied to the liquid droplet 14 by the surface 16a, 16b. For example, when the incline angle 48 is 0 degrees, the normal force urges the liquid droplet 14 directly upward, e.g., directly opposite the force of gravity, inhibiting downward movement of the liquid droplet 14. As another example, when the incline angle 48 is 90 degrees, the normal force is perpendicular to the force of gravity and does not counteract any of the force of gravity. The incline angle 48, and the direction and magnitude of the normal force, may be a predetermined constant based on a design of the vehicle 12, e.g., a fixed angle of the windshield 20 and/or the lens 22, that is stored in the memory.

The computer 26 may be programmed to predict the path 24 based on an acceleration of the vehicle 12. The acceleration of the vehicle 12 is a rate of change of velocity of the vehicle 12, e.g., increasing or decreasing speed, changing a heading direction, etc. The computer 26 may determine the acceleration of the vehicle 12 based on information from the sensors 40, navigation system 44, etc., e.g., received via the communication network 46. The acceleration affects the path 24 of the vehicle 12 based on a difference in momentum between the liquid droplet 14 and the surface 16a, 16b when the vehicle 12 is accelerating. For example, when the braking system 34 actuates to decelerate the vehicle 12, the momentum of the liquid droplet 14 relative to the decelerating vehicle 12 may urge the liquid droplet 14 toward the front of the vehicle 12.

The computer 26 may be programmed to predict the path 24 based on a size of the liquid droplet 14. The size of the liquid droplet 14 may be a length of the liquid droplet 14 along the surface 16a, 16b, a width of the liquid droplet 14 along the surface 16a, 16b, a diameter of the liquid droplet 14, etc. The computer 26 may determine the size of the liquid droplet 14 based on information from the optical sensor 18. For example, the computer 26 may determine the length, width, diameter, etc., of the group of pixels identified as the liquid droplet 14.

The size of the liquid droplet 14 alters the effect of other factors on the path 24 of the liquid droplet 14. For example, a larger liquid droplet may be more likely to travel along the surface 16a, 16b when the vehicle 12 accelerates, in response to ambient air movement relative to the vehicle 12, etc., as compared to a smaller liquid droplet. For example, the larger droplet may have increased momentum that affects movement from acceleration of the vehicle 12, increased drag that affects the magnitude of force on the liquid droplet 14 from ambient air movement, etc.

The computer 26 may be programmed to predict the path 24 based on a hydrophobicity of the surface 16a, 16b. Hydrophobicity of the surface 16a, 16b is an amount of absorption/repulsion of the liquid droplet 14 on the surface 16a, 16b. Hydrophobicity of a surface may be referred to as wettability. Hydrophobicity as is known is a unitless quality and is quantified with various scales that provide relative indications of hydrophobicity, e.g., interface scale, octanol scale, and octanol-interface scale. The hydrophobicity may be indicated by a measured and/or calculated contact angle of a liquid droplet 14 with the surface 16a, 16b. The higher the hydrophobicity the less force required to move the liquid droplet 14 along the surface 16a, 16b. The hydrophobicity may depend on a texture of the surface 16a, 16b, a coating on the surface 16a, 16b, etc. The hydrophobicity may be used to determine a constant for use when determining the path 26, e.g., determined based on empirical testing. In other words, the hydrophobicity may be used in combination with other factors, e.g., a liquid droplet 14 may be more likely to travel along a surface 16a, 16b with a relatively higher hydrophobicity when the vehicle 12 accelerates, in response to ambient air movement relative to the vehicle 12, etc., as compared to a liquid droplet 14 on a surface 16a, 16b with a relatively lower hydrophobicity. The computer 26 may determine the hydrophobicity, e.g., based on a detected and/or determined contact angle of the liquid droplet 12 on the surface 16a, 16b. The computer 26 may use the detected and/or determined contact angle to select a constant for determining the path 26, e.g., with a look up table or the like.

The computer 26 may be programmed to predict the path 24 based on the cleaning system 28. For example, actuation of the cleaning system 28 may generate air flow, e.g., from the nozzle 42 and across the surface 16a, 16b. For example, the computer 26 may store a force and direction of such force applied to the liquid droplet 14 when the cleaning system 28 is actuated. The computer 26 may store multiple forces and directions, e.g., a direction for each nozzle 42 and various forces depending on various air flow rates out of the nozzle 42. The computer 26 may store various forces based on a position of the liquid droplet 14 relative to the nozzle 42, e.g., air from the nozzle 42 may apply greater force to the liquid droplet 14 when the droplet is closer to the nozzle 42 as compared to when the liquid droplet 14 is further away.

The computer 26 may be programmed to predict the path 24 based on stored data indicating one or more previous positions of the liquid droplet 14. For example, the stored previous positions of the liquid droplet 14 (P-1, T-1, P-2, T-2, etc.) may indicate that the liquid droplet 14 is moving across the surface 16a, 16b in a certain direction and at a certain speed. The direction may be indicated by one or more vectors, e.g., extending from P-3, T-3 to P-2, T-2, from P-2, T-2 to P-1, T-1, etc. The speed may be indicated by a length of such vectors, e.g., when the positions are captured at regular time intervals. In other words, the computer 24 may determine such speed and direction based on the change in positions and associated change in times of the stored data. The computer 26 may extrapolate additional positions at future times to predict the path 24, e.g., the computer 24 may determine a best fit curve to the stored positions and the predicted positions may be along such best fit curve.

Figure 4:
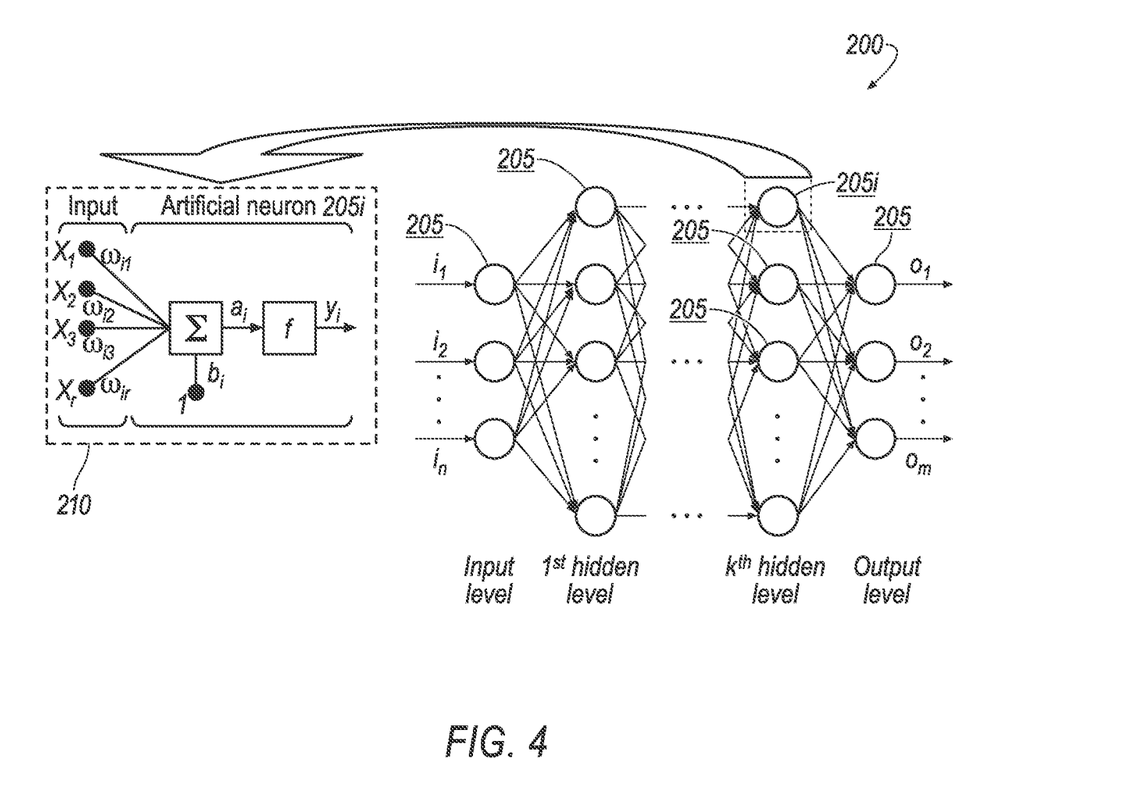
FIG. 4 illustrates an example Deep Neural Network (DNN).

The computer 26 may be programmed to predict a path 24 with a machine learning programming, e.g., a neural network, such as a deep neural network 200 (shown in FIG. 4). The DNN 200 can be a software program that can be loaded in memory and executed by a processor included in the computer 26, for example. The DNN 200 can include n input nodes 205, each accepting a set of inputs i (i.e., each set of inputs i can include on or more inputs x). The DNN 200 can include m output nodes (where m and n may be, but typically are not, a same number) provide sets of outputs $o_1 \ldots o_m$. The DNN 200 includes a plurality of layers, including a number k of hidden layers, each layer including one or more nodes 205. Each layer may consist of a specific type such as fully connected, convolutional, dropout, pooling, softmax, etc. The nodes 205 are sometimes referred to as artificial neurons 205, because they are designed to emulate biological, e.g., human, neurons. A neuron block 210 illustrates inputs to and processing in an example artificial neuron 205i. A set of inputs $x_1 \ldots x_r$ to each neuron 205 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 205i output $y_i$. The activation function $f$ can be a variety of suitable functions, typically selected based on empirical analysis. The respective neurons 205 may be feed forward or recurrent, e.g., long short-term memory (LSTM) units.

A set of weights w for a node 205 together are a weight vector for the node 205. Weight vectors for respective nodes 205 in a same layer of the DNN 200 can be combined to form a weight matrix for the layer. Bias values b for respective nodes 205 in a same layer of the DNN 200 can be combined to form a bias vector for the layer. The weight matrix for each layer and bias vector for each layer can then be used in the trained DNN 200. Training may be an iterative operation. In one example, the computer 180 may be programmed to perform an iterative training until an error, i.e., a difference between an expected output (based on training data e.g., obtained from simulation or experimentation) relative to an output from the trained DNN 200, is less than a specified threshold or loss, e.g., 10%.

The DNN 200 can be trained with inputs including velocity of the vehicle 12, acceleration of the vehicle 12, wind velocity, an incline angle(s) 48 of surface(s) 16a, 16b, a size of the liquid droplet 14, a position of the liquid droplet 14 (P0, T0), stored data indicating one or more previous positions of the liquid droplet 14 (P-1, T-1; P-2, T-2; etc.), the hydrophobicity of the surface 16a, 16b, actuation of the cleaning system 28, etc., and to output a predicted path of the liquid droplet 14, including predicted positions and associated times (P1, T1; P2, T2; etc.). The DNN 200 can be trained with ground truth data, i.e., data about a real-world or baseline condition or state, such as vehicle and wind velocities, surface incline angles, liquid droplet sizes, surface hydrophobicity, air temperature, humidity, cleaning system actuation, etc. Weights w can be initialized by using a Gaussian distribution, for example, and a bias b for each node 205 can be set to zero. Training the DNN 200 can including updating weights and biases via conventional techniques such as back-propagation with optimizations. Data can be associated with paths for training the DNN 200, i.e., known paths of liquid droplets may be associated with the input ground truth data.

Once the DNN 200 is trained, the computer 26 can input the velocity of the vehicle 12, the acceleration of the vehicle 12, the wind velocity, the incline angle 48 of the surface 16a, 16b, the size of the liquid droplet 14, the position of the liquid droplet 14, stored data indicating one or more previous positions of the liquid droplet 14, the hydrophobicity of the surface 16a, 16b, and actuation of the cleaning system 28 and can output a predicted path 24 of the liquid droplet 14.

The computer 26 may be programmed to identify an amount of time for the liquid droplet 14 to reach a future position. The future position is a specific position along the path 24. For example, the future position may be at an edge, i.e., an outer perimeter, of the pixels in the image data captured by the optical sensor 18. When the liquid droplet 14 is at the edge (i.e., substantially out of the field of view 38) the liquid droplet is unlikely to interfere with image data collected by the optical sensor 18. In other words, when the liquid droplet is at the edge, a portion of the liquid droplet 14 will be out of the field of view 38, and the path 24 may indicate that the liquid droplet 14 will move out of the field of view 38. As another example, the future position may be relative to other objects 36, such as cars, pedestrians, etc., identified by the computer 26 in the image data. The computer 26 may compare the predicted path 24 with the future position, where the predicted path 24 indicates how long it is predicted for the liquid droplet 14 to reach such position.

The computer 26 may be programmed to determine the amount of time to reach the future position is greater than a threshold amount of time. The threshold amount of time may be predetermined and stored in the memory of the computer 26. The threshold amount of time may be determined based on data collection requirements for the optical sensor 18, e.g., the threshold amount of time may be an amount of time the computer 26 may operate the vehicle 12 based on information from the optical sensor 18, e.g., while an amount of data indicating an environment around the vehicle 12 is limited by the liquid droplet 14. For example, how long the computer 26 may operate the vehicle 12 while the liquid droplet 14 obscures detection of a secondary vehicle represented by pixels in the image data.

The computer 26 may be programmed to determine that the path 24 is from a low priority area 52 on the surface 16a, 16b to a high priority area 54 on the surface 16a, 16b, and vice versa. The high priority area 54 is an area within the field of view 38 that has a higher probability of containing detectable objects 36 that may interfere with operation of the vehicle 12 as compared to the low priority area 52. For example, when the field of view 38 of the optical sensor 18 is in the vehicle forward direction, the high priority area 54 may be at a bottom half and at a center of the image data and/or field of view 38. The center of the image data is likely where a road on which the vehicle 12 is traveling would be located. Objects 36 in the road would be more likely to interfere with operation of the vehicle 12 than objects 36 to the side of the road. Objects 36 identified in the image data are likely to be closer to the vehicle 12 the lower they are in the image data, and therefor for more likely to interfere with navigation of the vehicle 12. Objects 36 above the bottom half of the image data are likely above the horizon, e.g., elevated above the roadway and not likely to interfere with navigation of the vehicle 12.

The high priority area 54 and low priority area 52 may be a fixed area in the field of view 38 and stored in the memory. The computer 26 may determine the high priority area 54 and low priority area 52, e.g., based on stored data indicating previously detected objects, based on detected edges of a lane of travel and/or a roadway, where the edges enclose the high priority area 54, based on a detected horizon where the high priority area 54 is below the horizon, etc. For example, moving objects may have a higher priority that non-moving objects, objects 36 moving toward interference with operation of the vehicle 12 may have a higher priority than objects 36 moving away from interference with navigation of the vehicle 12, etc.

The computer 26 may break down the field of view 38 and image data into more discrete levels of probability of having objects 36 that may interfere with operation of the vehicle 12, e.g., very low, low, medium-low, medium, medium high, high, and very high.

The computer 26 may be programmed to actuate one or more vehicle components based on the path 24. The vehicle components are electrical, electromechanical, hydraulic, or other components of the vehicle 12 that may be actuated by the computer 26. Example vehicle components and actuations include: actuating the steering system 32 to change a steering angle of the vehicle 12, actuating the propulsion system 30 to change the speed of the vehicle 12, actuating the braking system 34 to slow the vehicle 12, actuating the cleaning system 28 to clean the surface 16a, 16b, etc. The computer 26 may actuate vehicle components by transmitting one or more instructions via the communication network 46.

The computer 26 may be programmed to the actuate propulsion system 30, the steering system 32, and the braking system 34 based on the path 24. For example, the computer 26 may actuate the steering system 32 to operate the vehicle 12 closer to a right side or a left side of the lane to change the location of priority areas in the field of view 38 relative to the path 24, e.g., by moving the position of the detected lane within the field of view 38. Changing the location of the priority areas may make it such that the path 24 and/or liquid droplet 14 are changed from being in a high priority area 54, e.g., covering a portion the lane, to a low priority area 52, e.g., next to the lane. As another example, the computer 26 may use the path 24 to predict when one or more objects 36, such as other vehicles, detected in the field of view 38, may be obscured by the liquid droplet 14. When such objects 36 are obscured by the path 24 they may not be detectable based on image data from the optical sensor 18. The computer 26 may be programmed to operate the vehicle 12, e.g., in the autonomous mode and/or semi-autonomous mode, as if the detection of the object 36 was not lost. In other words, the computer 26 may operate the vehicle 12 based on an assumption that the object 36 detected in the path 24 is still in a same position, moving with at a same trajectory, etc., when the liquid droplet 14 covers the object 36 as the liquid droplet 14 travels along the path 24. The computer 26 may further analyze image data along the path 24 to re-acquire detection of the object 36 after the liquid droplet 14 has moved further along the path 24 and no longer covers the object 36.

The computer 26 may be programmed to actuate the cleaning system 28, e.g., to the on state, based on the path 24. The computer 26 may actuate the cleaning system 28 by transmitting an instruction via the communication network 46 indicating the on-state in which air is provided to the nozzles 42 and blows across the surface 16a, 16b. Blowing air across the surface 16a, 16b may change the path 24. Additionally/alternatively, the computer 26 may transmit an instruction indicating actuation of wipers of the cleaning system 28.

The computer 26 may be programmed to predict a second path 24 of the liquid droplet 14 after actuating the cleaning system 28, e.g., to the on state. After the cleaning system 28 is actuated may be after the cleaning system 28 is actuated to the on state, e.g., while air is being provided to the surface 16a, 16b from the nozzles 42. After the cleaning system 28 is actuated may be after the cleaning system 28 is actuated to the on state, e.g., to blow or wipe the surface 16a, 16b, and then is actuated to an off state, e.g., to stop blowing or wiping the surface 16a, 16b. The computer 26 may also evaluate the effects of the actuating the cleaning system 28, e.g. air pressure, on the predicted second path.

The computer 26 may be programmed to wait an amount of time after predicting the path 24, and then update one or more parameters of the prediction based on a comparison of a subsequently identified position of the liquid droplet 14 with the path 24. Updating the parameters based on the comparison improves accuracy of subsequent predicted paths 24. The amount of time may be predetermined, e.g., 500 milliseconds, and stored in the memory of the computer 26. The parameters of the prediction are one or more values used by the computer 26 when determining the predicted path 24 of the liquid droplet 14. For example, the computer 26 may update the constant indicating the hydrophobicity of the surface 16a, 16b, e.g., such that the position of previously predicted path 24 matches the subsequently identified position of the liquid droplet 14.

Process

Figure 6:
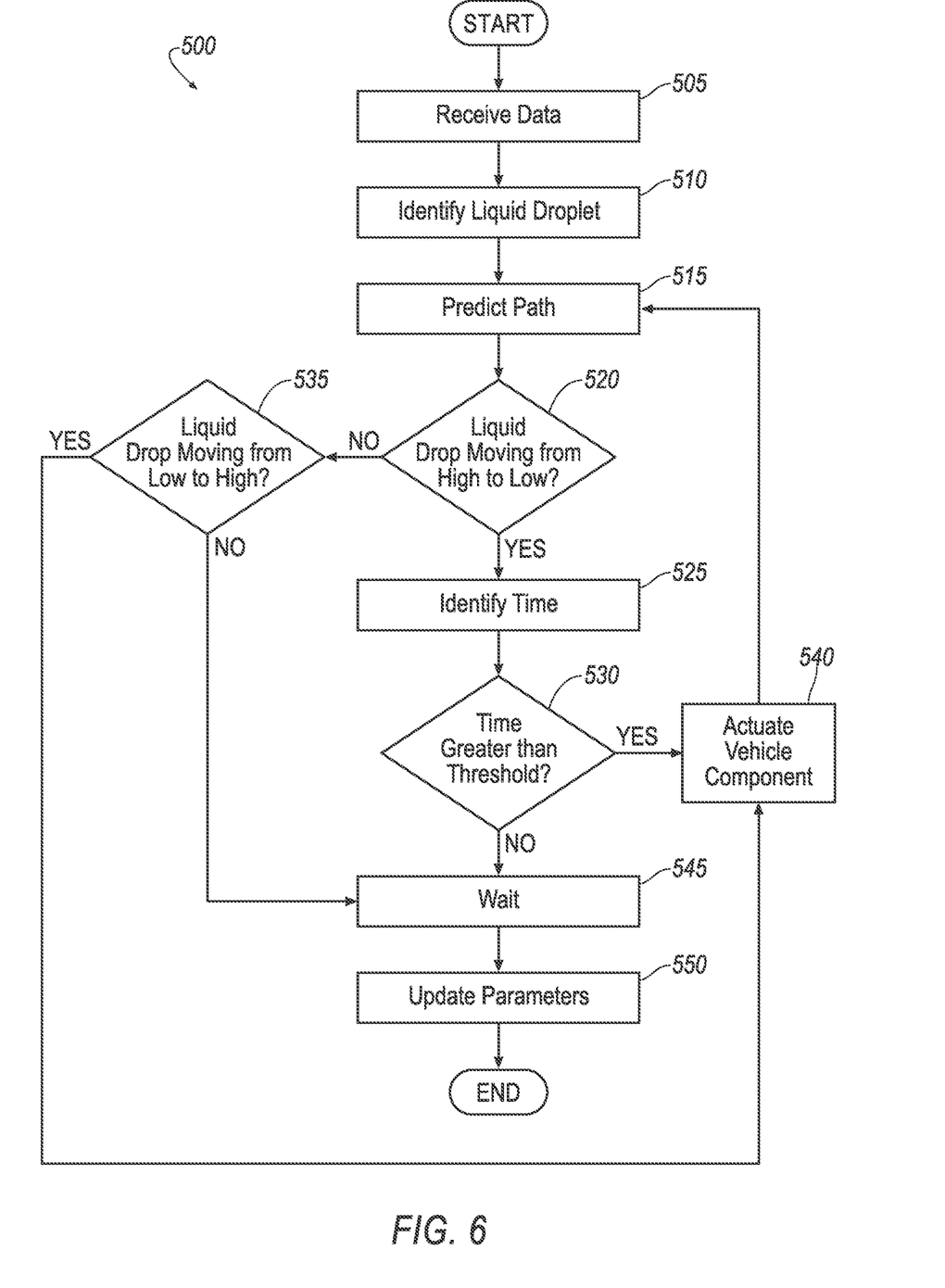
FIG. 6 is a flow chart illustrating a process for controlling the vehicle having the system for prediction a path of a liquid droplet.

FIG. 6 is a process flow diagram illustrating an exemplary process 500 for operating the system 10. The process 500 begins in a block 505 where the computer 26 receives data from the optical sensor 18, the sensors 40, the navigation system 44, etc., e.g., via the communication network 46. The computer 26 may receive such data substantially continuously or at time intervals, e.g., every 50 milliseconds. The computer 26 may store the data, e.g., on the memory.

At a block 510 the computer 26 identifies a liquid droplet 14 on the surface 16a, 16b. The computer 26 may identify the liquid droplet 14, and the position of such liquid droplet 14 (including multiple positions over time), based on image data received from the optical sensor 18 via the communication network 46, e.g., as described herein. The computer 26 may store data indicating the detected position(s) of the identified liquid droplet 14. The computer 26 may continue to identify and store detected position(s) of the liquid droplet 14 throughout the process 500.

Next at a block 515 the computer 26 predicts a path 24 of the liquid droplet 14 identified on the surface 16a, 16b at the block 510. The computer 26 may predict the path 24 of the liquid droplet 14 based on one or more of the acceleration of the vehicle 12, the velocity of the vehicle 12, the wind velocity, the incline angle 48 of the surface 16a, 16b, the size of the liquid droplet 14, the hydrophobicity of the surface 16a, 16b, and/or on stored data indicating one or more previous detected positions of the liquid droplet 14 e.g., as described herein.

Next at a block 520 the computer 26 determines whether the path 24 indicates the liquid droplet 14 is predicted to move from a high priority area 54 to a low priority area 52 in the field of view 38 of the optical sensor 18, e.g., as described herein. When the computer 26 determines the liquid droplet 14 is predicted to move from the high priority area 54 to the low priority area 52 the process 500 moves to a block 525. When the computer 26 determines the liquid droplet 14 is not predicted to move from the high priority area 54 to the low priority area 52 the process 500 moves to a block 535.

At the block 525 the computer 26 identifies an amount of time for the liquid droplet 14 to reach the low priority area 52, e.g., based on the predicted path 24 and as described herein.

Next at a block 530 the computer 26 determines whether the amount of time identified in the block 525 is greater than a threshold amount of time, e.g., as described herein. When the computer 26 determines the amount of is greater than the threshold the process 500 moves to a block 540. When the computer 26 determines the amount of time is not greater than the threshold amount of time the process moves to a block 545.

Next at a block 535 the computer 26 determines whether the path 24 indicates the liquid droplet 14 is predicted to move from a low priority area 52 to a high priority area 54 in the field of view 38 of the optical sensor 18, e.g., as described herein. When the computer 26 determines the liquid droplet 14 is predicted to move from the low priority area 52 to the high priority area 54 the process 500 moves to the block 540. When the computer 26 determines the liquid droplet 14 is not predicted to move from the low priority area 52 to the high priority area 54 to the process 500 moves to the block 545.

At the block 540 the computer 26 actuates one or more vehicle components, e.g., as described herein. For example, the computer 26 may transmit an instruction to the cleaning system 28 to actuate to the on state to blow air across the surface 16a, 16b. After an amount of time, e.g., 2 seconds, the computer 26 may actuate the cleaning system 28 to the off state. As another example, the computer 26 may actuate the propulsion system 30, the steering system 32, and/or braking system 34 based on the path 24, e.g., as described herein. After the block 540 the process may return to the block 515, e.g., to again predict the path 24 of the liquid droplet 14. Alternatively, the process 500 may end.

At the block 545 the computer 26 waits an amount of time, e.g., as described herein.

Next at a block 550 the computer 26 identifies a position of the liquid droplet and updates one or more parameters of the prediction, e.g., of the algorithm used to determine the path 24, based on a comparison of the position of the liquid droplet 14 identified in the block 550 with the path 24 predicted in the block 515. After the block 550 the process 500 may end. Alternatively, the process 500 may return to the block 510.

CONCLUSION

With regard to the process 500 described herein, it should be understood that, although the steps of such process 500 have been described as occurring according to a certain ordered sequence, such process 500 could be practiced with the described steps performed in an order other than the order described herein. It further should be understood that certain steps could be performed simultaneously, that other steps could be added, or that certain steps described herein could be omitted. In other words, the description of the process 500 herein is provided for the purpose of illustrating certain embodiments and should in no way be construed so as to limit the disclosed subject matter.

Computing devices, such as the computer 26, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a processor; and
a memory storing instructions executable by the processor to:
predict a path of a liquid droplet on a surface; and
then, actuate one or more vehicle components based on the path.

2. The system of claim 1, the instructions further including instructions to determine that the path is from a low priority area on the surface to a high priority area on the surface, wherein the high priority area has a higher probability of containing detectable objects that may interfere with operation of a vehicle as compared to the low priority area.

3. The system of claim 1, the instructions further including instructions to predict the path based on at least one of a vehicle velocity, a wind velocity, an incline angle of the surface, a vehicle acceleration, a size of the liquid droplet, and a hydrophobicity of the surface.

4. The system of claim 1, the instructions further including instructions to predict the path based on stored data indicating one or more previous positions of the liquid droplet.

5. The system of claim 1, the instructions further including instructions to actuate the one or more vehicle components by actuating a cleaning system.

6. The system of claim 5, the instructions further including instructions to predict a second path of the liquid droplet after actuating the cleaning system.

7. The system of claim 1, the instructions further including instructions to actuate the one or more vehicle components by actuating at least one of a steering system, a braking system, and a propulsion system.

8. The system of claim 1, the instructions further including instructions to wait an amount of time after predicting the path, and then update one or more parameters of the prediction based on a comparison of a position of the liquid droplet with the path.

9. The system of claim 1, further comprising an optical sensor defining a field of view and in communication with the processor, wherein the surface is in the field of view.

10. The system of claim 1, the instructions further including instructions to identify an amount of time for the liquid droplet to reach a future position, and to determine the amount of time to reach the future position is greater than a threshold amount of time.

11. The system of claim 1, wherein the surface is on one of a lens and a windshield.

12. A method, comprising:
predicting a path of a liquid droplet on a surface; and
then, actuating one or more vehicle components based on the path.

13. The method of claim 12, wherein the path is predicted based on at least one of a vehicle velocity, a wind velocity, an incline angle of the surface, a vehicle acceleration, a size of the liquid droplet, and a hydrophobicity of the surface.

14. The method of claim 12, further comprising waiting an amount of time after predicting the path, and then updating one or more parameters of the prediction based on a comparison of a position of the liquid droplet with the path.

15. The method of claim 12, further comprising identifying an amount of time for the liquid droplet to reach a future position, and to determine the amount of time to reach the future position is greater than a threshold amount of time.

16. The method of claim 12, wherein actuating one or more vehicle components includes actuating a cleaning system, and further comprising predicting a second path of the liquid droplet after actuating the cleaning system.

17. The method of claim 12, wherein the path is predicted based on stored data indicating one or more previous positions of the liquid droplet.

18. A system, comprising:
means for detecting a liquid droplet on a surface;
means for predicting a path of the liquid droplet on the surface; and
means for moving the liquid droplet relative to the surface based on the path.

19. The system of claim 18, further comprising means for navigating a vehicle based on the path.

20. The system of claim 18, further comprising means for determining that the path is from a low priority area on the surface to a high priority area on the surface, wherein the high priority area has a higher probability of containing detectable objects that may interfere with operation of a vehicle as compared to the low priority area.

* * * * *